United States Patent
Chen

(10) Patent No.: US 8,539,857 B2
(45) Date of Patent: Sep. 24, 2013

(54) OPERATION MECHANISM FOR CONTROLLING FRONT SUSPENSION SYSTEM

(75) Inventor: Hui-Hsiung Chen, Taichung Hsien (TW)

(73) Assignee: Kuo-Yi Chu, Hsinchu County (TW)

( * ) Notice: Subject to any disclaimer, the term of this patent is extended or adjusted under 35 U.S.C. 154(b) by 553 days.

(21) Appl. No.: 12/835,957

(22) Filed: Jul. 14, 2010

(65) Prior Publication Data
US 2011/0265600 A1 Nov. 3, 2011

(30) Foreign Application Priority Data
Apr. 29, 2010 (TW) ................................ 99207874 U

(51) Int. Cl.
*B62K 23/06* (2006.01)
(52) U.S. Cl.
USPC .................................................... 74/502.2
(58) Field of Classification Search
USPC .............. 74/500.5, 501.6, 501.5 H, 502.2, 74/489, 519; 280/276; 188/285
See application file for complete search history.

(56) References Cited

U.S. PATENT DOCUMENTS

| | | | | |
|---|---|---|---|---|
| 4,667,785 A * | 5/1987 | Toyoda et al. | | 192/13 A |
| 6,389,928 B1 * | 5/2002 | Kobayashi et al. | | 74/536 |
| 6,767,024 B1 * | 7/2004 | Kuo | | 280/276 |
| 7,806,022 B2 * | 10/2010 | Hara | | 74/502.2 |
| 8,065,932 B2 * | 11/2011 | Hara et al. | | 74/502.2 |
| 2005/0103149 A1 * | 5/2005 | Hunt et al. | | 74/502.2 |
| 2010/0307281 A1 * | 12/2010 | Hsu | | 74/502.2 |

FOREIGN PATENT DOCUMENTS
CN 201367086 Y * 12/2009

* cited by examiner

*Primary Examiner* — Thomas Diaz
(74) *Attorney, Agent, or Firm* — Rosenberg, Klein & Lee

(57) ABSTRACT

An operation mechanism for locking or unlocking the front suspension system of bicycles includes a base with a lever frame pivotably connected thereto. The control cable is connected to the lever frame which has a pin. A movable member is located in the base and includes two hooks and two slots are defined through the hooks. The base includes an axle which extends through the center of the lever frame and the two slots. The pin on the movable member is removably hooked by the hooks. A cover is mounted to the base to hide the movable member. The movable member is movable along a push rod and biased by a resilient member. A operation rod inserted into the base and pushes the movable member to remove the pin from the hooks so as to release the control cable.

8 Claims, 7 Drawing Sheets

SECTION:a-a

OPERATION MECHANISM FOR CONTROLLING FRONT SUSPENSION SYSTEM

FIELD OF THE INVENTION

The present invention relates to an operation mechanism, and more particularly, to an operation mechanism for locking or unlocking the front suspension system of bicycles.

BACKGROUND OF THE INVENTION

A conventional operation mechanism 7 for locking or unlocking the front suspension system for bicycles is shown in FIG. 8, and generally includes a base 71 with two lugs 72 and a hole 73 to which the handlebar of the bicycle (not shown) is securely connected. A first lever 74 is pivotably connected to the base 71 by a shaft 743 extending through the lugs 72 of the base 71, and includes a passage 741 and a first pin 742. An end of the operation cable is engaged with the passage 741 and the first pin 742 extends through the lever 74. A second lever 75 includes a torsion spring 751 and a positioning portion 752, wherein the second lever 75 is pivotably connected to the base 71 by extending a second pin 753 through the lugs 72. The pin 742 is cooperated with the engaging portion 752. When the first lever 74 is pivoted, the second lever 75 is moved to a locked position top lock the front suspension system. When the second lever 75 is pivoted, the first lever 74 returns to its initial position to unlock the front suspension system.

However, the first and second levers 74, 75 are respectively located at two different positions of different heights, and the operation directions of the first and second levers 74, 75 are opposite to each other, so that the operation is not convenient to the users. Besides, the coefficient of elasticity of the torsion spring is so large that the users have to press the first lever and the second lever by a significant force and angle, and this is not suitable for the users who have less muscle force. Furthermore, the user's finger could be clamped by in gap between the first lever and the handlebar.

The present invention intends to provide an operation mechanism for locking or unlocking the front suspension system for bicycles, and the operation mechanism improves the shortcomings of the conventional operation mechanism.

SUMMARY OF THE INVENTION

The present invention relates to an operation mechanism locking or unlocking the front suspension system of bicycles includes and comprises a base having a tube connected thereto and an axle extends from a sidewall thereof. A control cable extends through the tube. A lever frame includes an engaging member, a pin and a lever, wherein the control cable is securely engaged with the engaging member. The axle of the base extends through a pivot hole defined through the lever frame and a pin extends through the lever frame. A movable member has two hooks with which the pin of the lever frame is removably engaged. A reception hole is defined in an end of the movable member so that a push rod has a first end fixed to the base and a second end of the push rod is inserted into the reception hole. A resilient member is mounted to the push rod and biased between the movable member and the base. An operation rod extends through the base and is inserted into the reception hole of the movable member to push the push rod. A cover has a connection hole and the axle of the base extends through the connection hole.

The primary object of the present invention is to provide an operation mechanism locking or unlocking the front suspension system of bicycles wherein the operation of the operation mechanism is easy and convenient.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
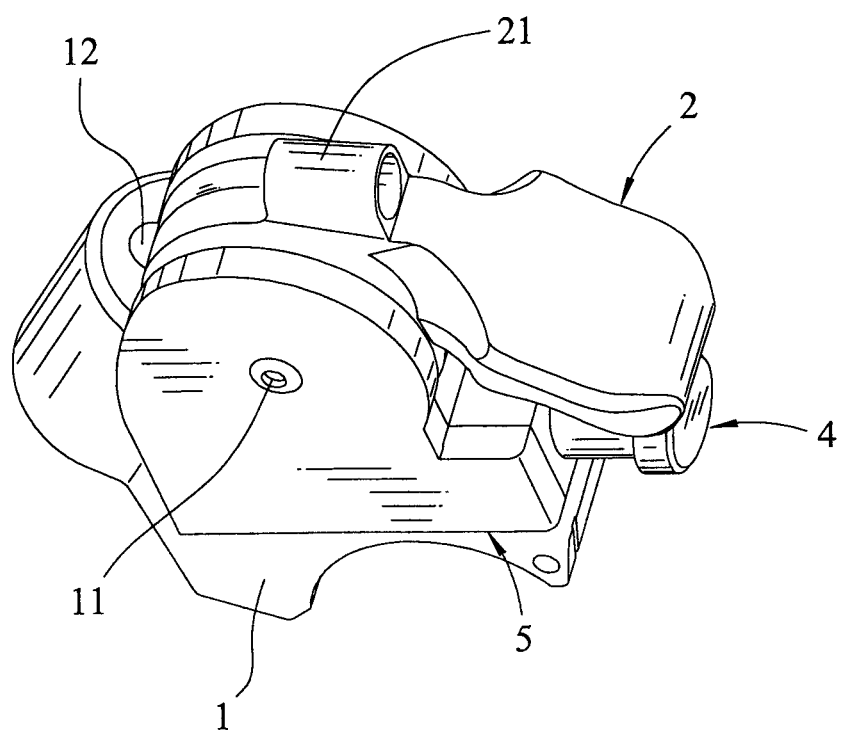
FIG. 1 is a perspective view to show the operation mechanism of the present invention.
Figure 2:
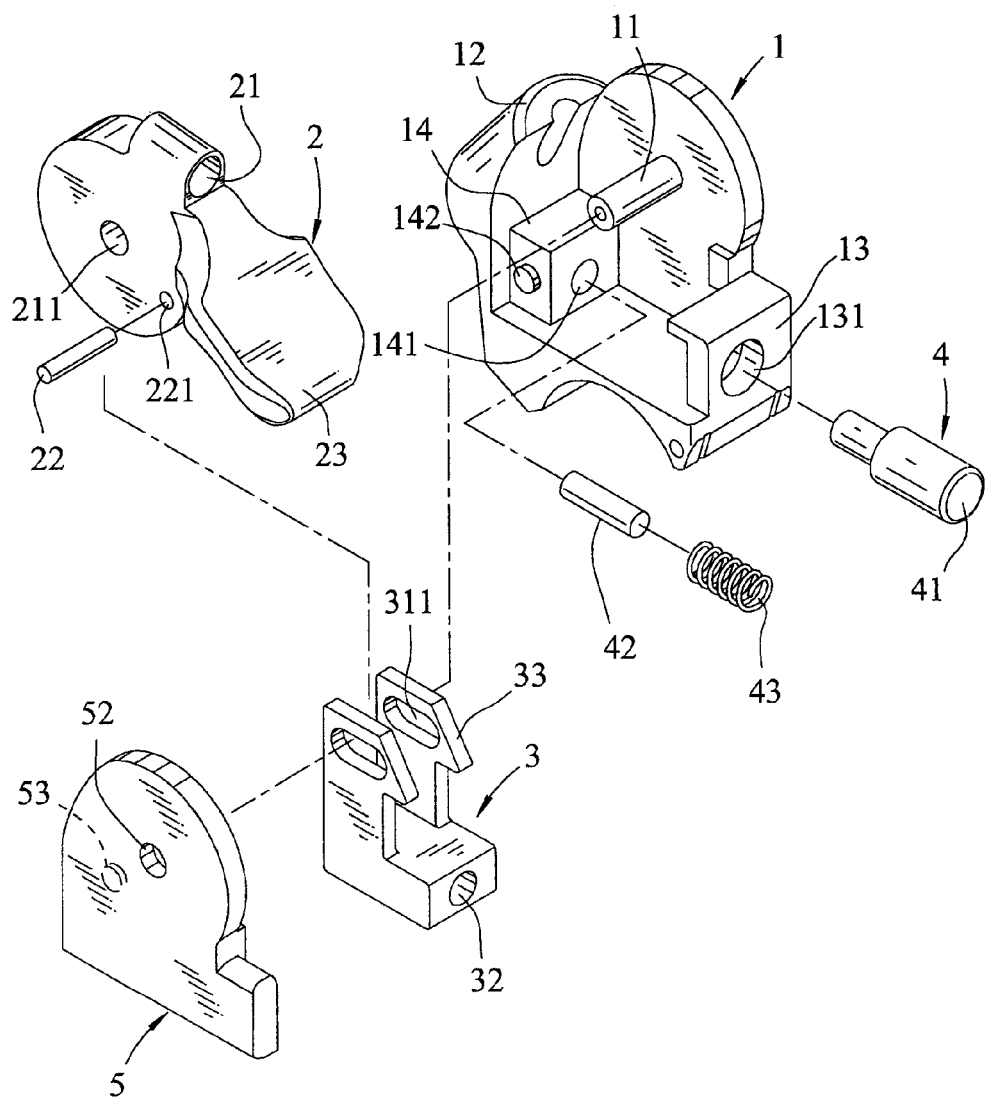
FIG. 2 is an exploded view to show the operation mechanism of the present invention.
Figure 3:
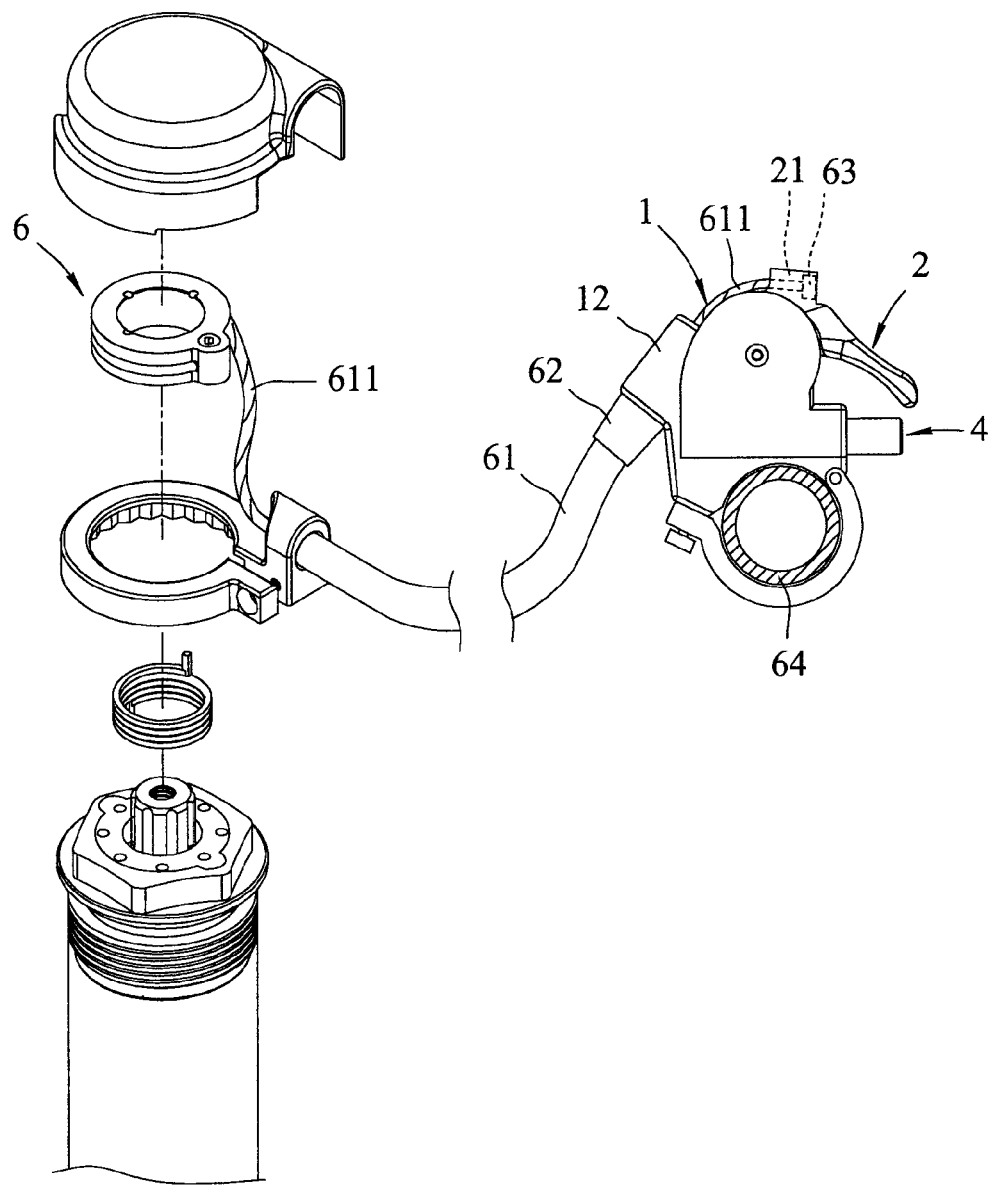
FIG. 3 shows the front suspension system and the operation mechanism of the present invention.

Referring to FIGS. 1 to 3, the operation mechanism for locking or unlocking the front suspension system of bicycles of the present invention comprises a base 1 having a tube 12 connected thereto and an axle 11 extends from a sidewall thereof. Preferably, the axle 11 is perpendicular to the axis of the tube 12. A control cable 611 extends through the tube 12. The base 1 includes a hollow interior space and an end wall 13 is located at a front end of the base 1. A passage 131 is defined through the end wall 13. A reception hole 32 is defined through the end wall 13. A rectangular member 14 is located in the hollow interior space and corresponding to the end wall 13. The rectangular member 14 has a recess 141 facing the passage 131. A protrusion 142 extends from an outer surface thereof and the axis of the protrusion 142 is perpendicular to the axis of the recess 141.

A lever frame 2 includes an engaging member 21, a pin 22 and a lever 23, wherein a pivot hole 211 is defined through the lever frame 2 so that the axle 11 of the base 1 extends through the pivot hole 211. A pin 22 extends through a hole 221 in the lever frame 2 and two ends of the pin 22 protrude from two opposite sides of the lever frame 2. The lever 23 extends radially from the lever frame 2. The control cable 611 is securely engaged with the engaging member 21. The base 1 and the lever frame 2 are respectively made integrally by way of casting.

A movable member 3 includes two hooks 33 with a gap defined between the two hooks 33 and two slots 311 are respectively defined through the two hooks 33. The lever frame 2 is located between the two hooks 33 and the axle 11 of the base 1 extends through the two slots 311 of the movable member 3 and the pivot hole 211 of the lever frame 2. The lever 23 extends out from the base 1. A reception hole 32 is defined in an end of the movable member 3.

Figure 4:
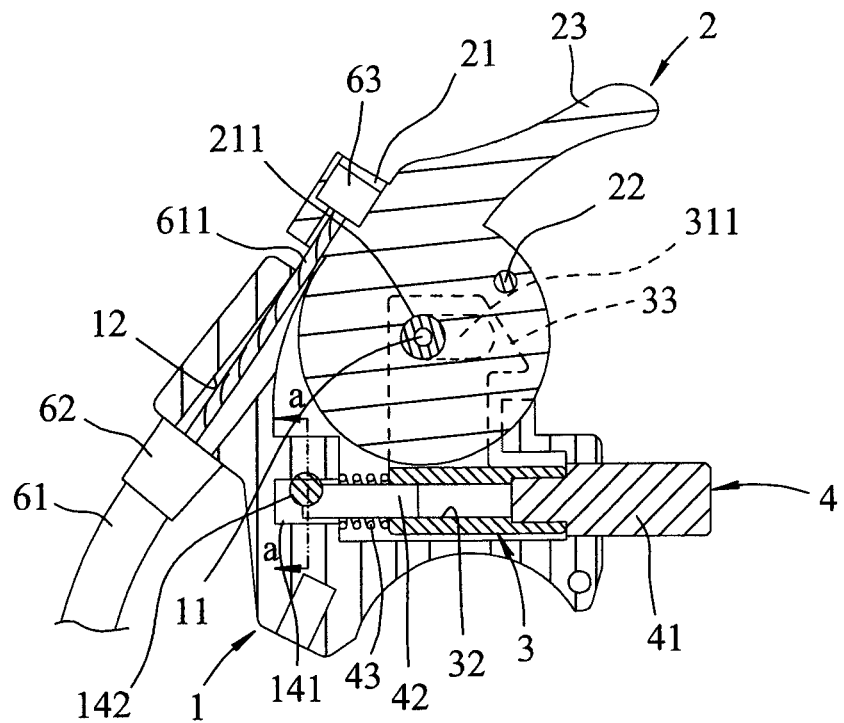
FIG. 4 is a cross sectional view of the operation mechanism of the present invention.
Figure 4:
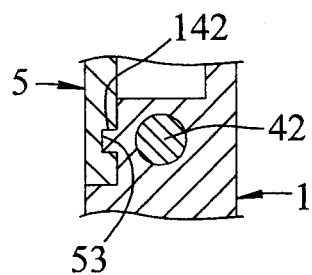

Further referring to FIG. 4, a release member 4 includes an operation rod 41, a resilient member 43 and a push rod 42, wherein the push rod 42 has a first end inserted into the recess 141 of the rectangular member 14 of the base 1 and a second end of the push rod 42 is inserted into the reception hole 32 of the movable member 3. The resilient member 43 is mounted to the push rod 42 and biased between the movable member 3 and the base 1. The operation rod 41 includes an insertion at an end thereof and the insertion is inserted into the reception hole 32 of the movable member 3 to push the push rod 42. In this embodiment, the resilient member 43 is a spring.

A cover 5 has a connection hole 52 and the axle 11 of the base 1 extends through the connection hole 52. A notch 53 is defined in an inside of the cover 5 and the protrusion 142 on the rectangular member 14 is engaged with the notch 53 to position the cover 5.

Figure 7:
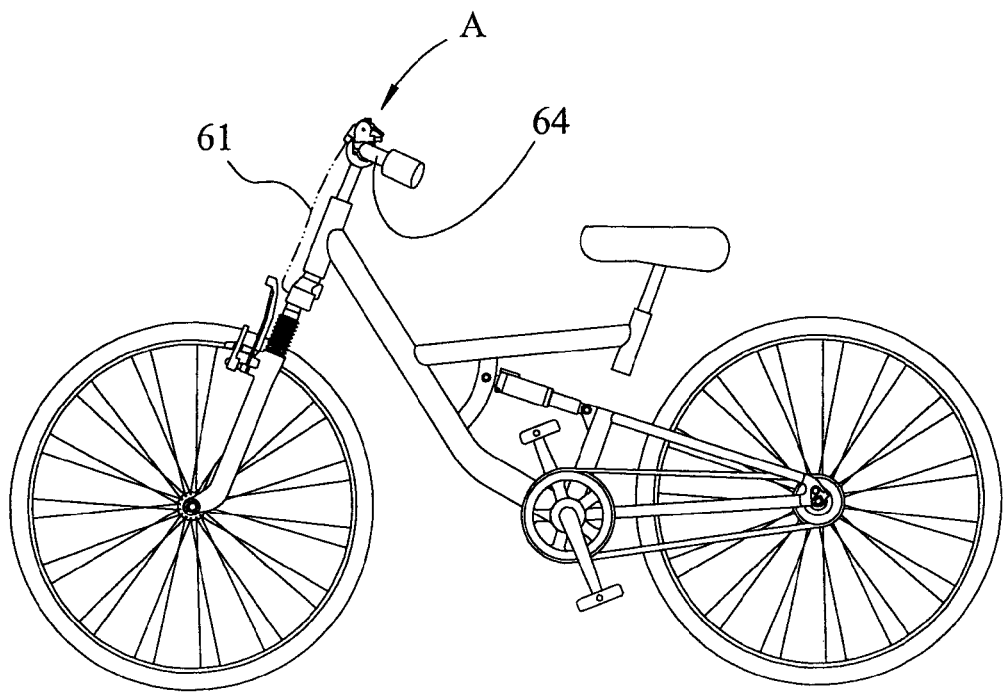
FIG. 7 shows that the operation mechanism of the present invention is connected to a bicycle.
Figure 8:
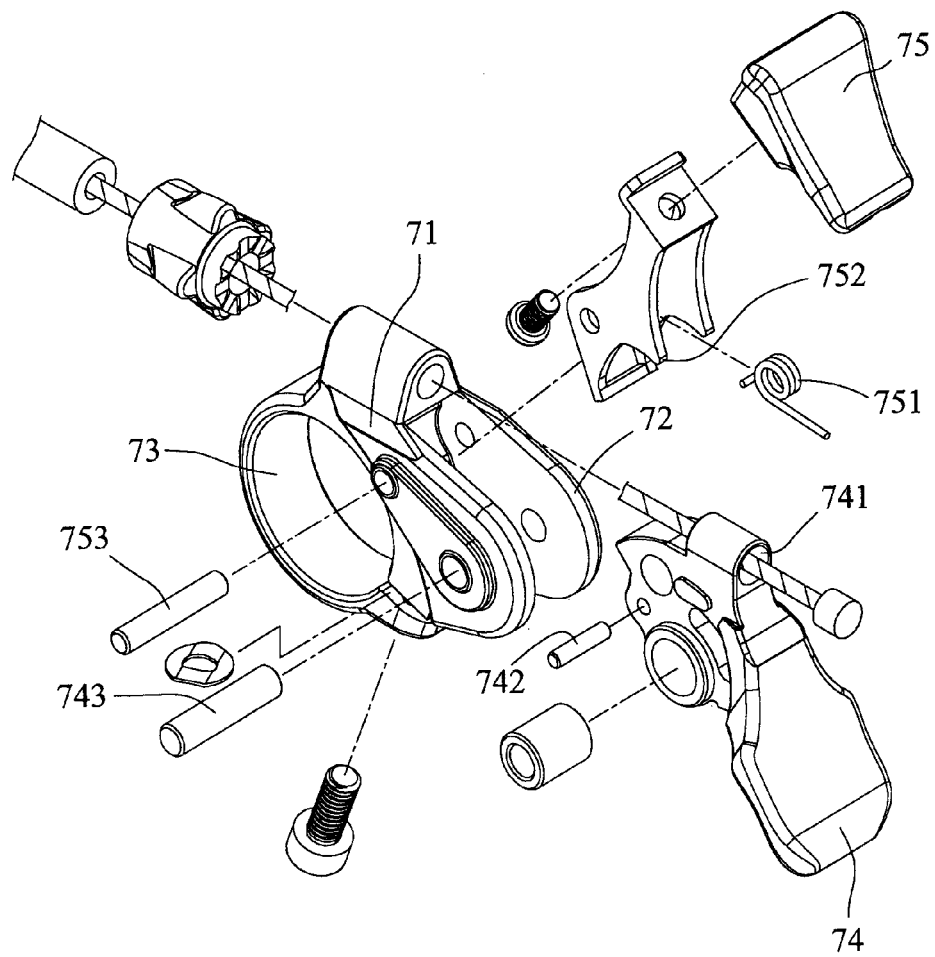
FIG. 8 shows a conventional operation mechanism.

Referring to FIGS. 3 and 7, the operation mechanism of the present invention is connected to the handlebar 64 of a bicycle "A" and the control cable 611 is protected by a sheath 61. A connection end 62 on the sheath 61 is connected to the tube 12 on the base 1 and the control cable 611 extends through the sheath 61 and the tube 12 and is securely connected with the engaging member 21 on the lever frame 2 by an end piece 63 of the control cable 611. The other end of the control cable 611 is connected with a locking ring 6 of the front suspension system.

Figure 5:
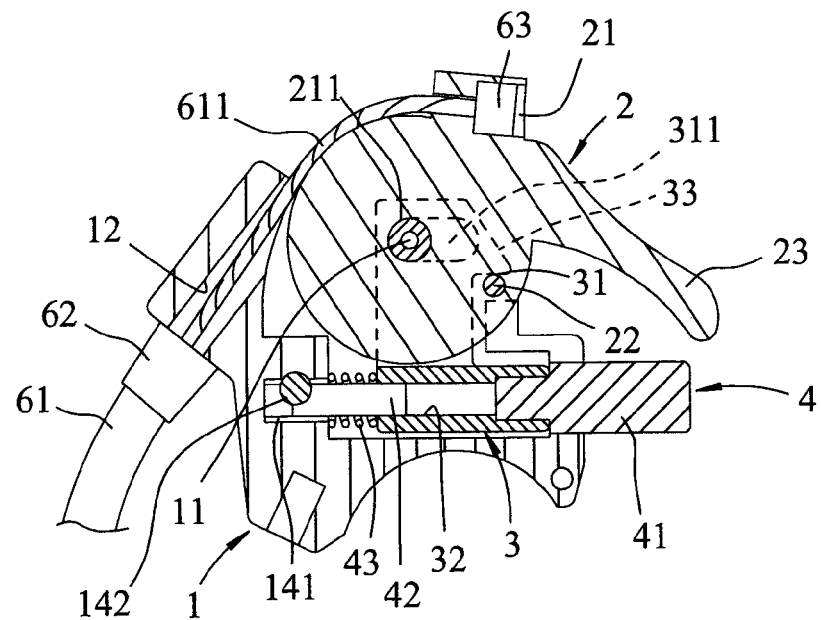
FIG. 5 shows that the pin is hooked by the hooks when the lever is pivoted downward to unlock the front suspension system.
Figure 6:
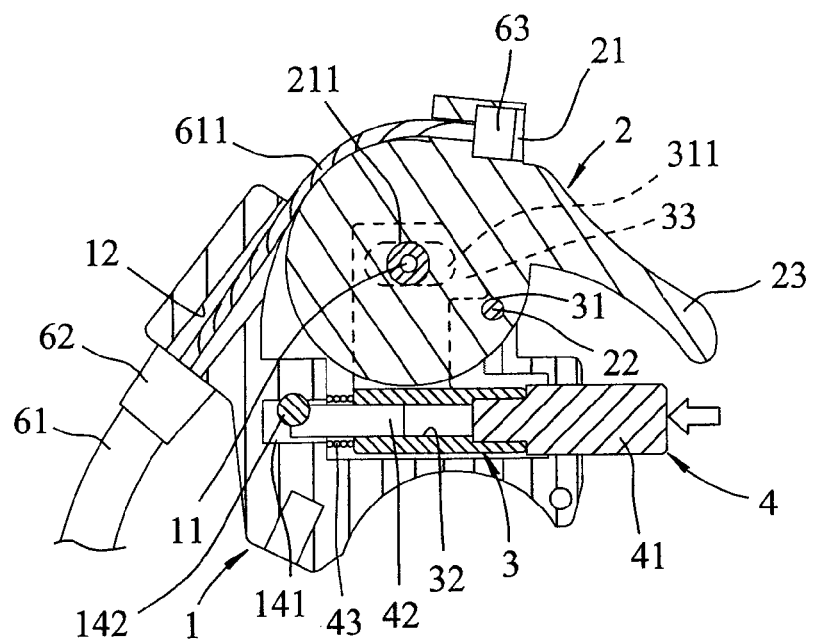
FIG. 6 shows that the pin is removed from the hooks when the release member is pushed to lock the front suspension system.

As shown in FIG. 5, when the user pivots the lever 23 downward, the lever frame 2 is pivoted about the axle 11 and the two ends of the pin 22 are moved along the inclined surfaces of the two hooks 33. The hooks 33 each have a positioning area 31 located beneath the inclined surface thereof and the two ends of the pin 22 are engaged with the positioning areas 31 when the lever 32 is pivoted downward to extend the control cable 611, such that the front suspension system is in locked status. As shown in FIG. 6, when the release member 4 is pushed, the movable member 3 is pushed a distance and the pin 22 is released from the positioning areas 31, so that the control cable 611 is released to pull the engaging member 21 and to pivot the lever frame 2. The front suspension system is unlocked as shown in FIG. 4.

While we have shown and described the embodiment in accordance with the present invention, it should be clear to those skilled in the art that further embodiments may be made without departing from the scope of the present invention.

What is claimed is:

1. An operation mechanism comprising:
   a base having a tube connected thereto and an axle extending from a sidewall thereof, a control cable extending through the tube;
   a lever frame having an engaging member, a pin and a lever, the control cable securely engaged with the engaging member and a pivot hole defined through the lever frame, the axle of the base extending through the pivot hole, the pin extending through the lever frame;
   a movable member having two hooks with which the pin of the lever frame is removably engaged, a reception hole defined in an end of the movable member;
   a release member including an operation rod, a resilient member and a push rod, the push rod having a first end fixed to the base and a second end of the push rod being inserted into the reception hole of the movable member, the resilient member mounted to the push rod and biased between the movable member and the base, the operation rod extending through the base and inserted into the reception hole of the movable member to push the push rod, and
   a cover having a connection hole and the axle of the base extending through the connection hole.

2. The mechanism as claimed in claim 1, wherein the base and the lever frame are respectively made integrally by way of casting.

3. The mechanism as claimed in claim 1, wherein the base includes a hollow interior space and an end wall is located at a front end of the base, a reception hole is defined through the end wall, a rectangular member is located in the hollow interior space and corresponding to the end wall, the rectangular member has a recess, the first end of the push rod is inserted into the recess of the rectangular member and the operation rod extends through the reception hole of the end wall to push the push rod.

4. The mechanism as claimed in claim 3, wherein the rectangular member includes a protrusion extending from an outer surface thereof and the cover has a notch in which the protrusion is engaged.

5. The mechanism as claimed in claim 1, wherein the resilient member is a spring.

6. The mechanism as claimed in claim 3, wherein the operation rod includes an insertion at an end thereof and the insertion is inserted into the reception hole of the movable member to push the push rod.

7. The mechanism as claimed in claim 1, wherein the movable member includes two slots respectively defined through the hooks and axle of the base movably extends through the two slots.

8. The mechanism as claimed in claim 7, wherein the hooks each have a positioning area and the pin is engaged with the positioning areas when the lever is pivoted downward to extend the control cable, when the release member is pushed, the movable member is pushed and the pin is released from the positioning areas.

* * * * *